United States Patent
Upadhyayula et al.

(10) Patent No.: US 11,390,522 B2
(45) Date of Patent: Jul. 19, 2022

(54) PROCESS FOR CONVERSION OF SULFUR TRIOXIDE AND HYDROGEN PRODUCTION

(71) Applicants: INDIAN INSTITUTE OF TECHNOLOGY, DELHI, New Delhi (IN); ONGC ENERGY CENTRE, New Delhi (IN)

(72) Inventors: Sreedevi Upadhyayula, New Delhi (IN); Ashok Niwritti Bhaskarwar, New Delhi (IN); Kishore Kondamudi, New Delhi (IN); Parvatalu Damaraju, New Delhi (IN); Bharat Bhargava, New Delhi (IN); Satinath Banerjee, New Delhi (IN)

(73) Assignees: Indian Institute of Technology, Delhi, New Delhi (IN); ONGC Energy Centre, New Delhi (IN)

( * ) Notice: Subject to any disclaimer, the term of this patent is extended or adjusted under 35 U.S.C. 154(b) by 723 days.

(21) Appl. No.: 16/096,785

(22) PCT Filed: Apr. 27, 2017

(86) PCT No.: PCT/IN2017/050150
§ 371 (c)(1),
(2) Date: Oct. 26, 2018

(87) PCT Pub. No.: WO2017/187454
PCT Pub. Date: Nov. 2, 2017

(65) Prior Publication Data
US 2021/0221683 A1    Jul. 22, 2021

(30) Foreign Application Priority Data
Apr. 28, 2016 (IN) .............................. 201611014896

(51) Int. Cl.
*C01B 17/50* (2006.01)
*B01J 21/04* (2006.01)
(Continued)

(52) U.S. Cl.
CPC ............. *C01B 17/503* (2013.01); *B01J 21/04* (2013.01); *B01J 23/002* (2013.01); *B01J 23/005* (2013.01);
(Continued)

(58) Field of Classification Search
None
See application file for complete search history.

(56) References Cited

U.S. PATENT DOCUMENTS

| 2,406,930 A | 9/1946 | Titlestad |
| 3,888,730 A | 6/1975 | Jackson |

(Continued)

FOREIGN PATENT DOCUMENTS

| JP | S5399097 A | 8/1978 |
| JP | S6245344 A | 2/1987 |

(Continued)

OTHER PUBLICATIONS

Yang et al, "Influence of calcination temperature on CuO—CeO2/SiC catalysts for SO3 decomposition in the sulfur-iodine cycle for hydrogen production", International Journal of Hydrogen Energy 41, pp. 3339-3348 (Year: 2016).*

(Continued)

*Primary Examiner* — Colin W. Slifka
(74) *Attorney, Agent, or Firm* — Robert L. Stearns; Dickinson Wright, PLLC

(57) ABSTRACT

A process for decomposition of sulfuric acid, particularly a process for catalytically decomposing sulfuric acid is used to obtain sulfur dioxide therefrom. Catalysts are used for (Continued)

Conditions: Pressure 1 bar; Residence time (τ) 0.5 s.

improving the dissociation efficiency by lowering the activation energy barrier for the reaction.

25 Claims, 2 Drawing Sheets

(51) Int. Cl.

| | | |
|---|---|---|
| *B01J 23/00* | (2006.01) | |
| *B01J 23/26* | (2006.01) | |
| *B01J 23/42* | (2006.01) | |
| *B01J 23/72* | (2006.01) | |
| *B01J 23/745* | (2006.01) | |
| *B01J 23/75* | (2006.01) | |
| *B01J 23/755* | (2006.01) | |
| *B01J 23/80* | (2006.01) | |
| *B01J 23/86* | (2006.01) | |
| *B01J 27/224* | (2006.01) | |
| *B01J 35/02* | (2006.01) | |
| *B01J 35/10* | (2006.01) | |
| *B01J 35/08* | (2006.01) | |
| *C01B 3/04* | (2006.01) | |

(52) U.S. Cl.
CPC ............... *B01J 23/26* (2013.01); *B01J 23/42* (2013.01); *B01J 23/72* (2013.01); *B01J 23/745* (2013.01); *B01J 23/75* (2013.01); *B01J 23/755* (2013.01); *B01J 23/80* (2013.01); *B01J 23/862* (2013.01); *B01J 23/866* (2013.01); *B01J 23/868* (2013.01); *B01J 27/224* (2013.01); *B01J 35/023* (2013.01); *B01J 35/08* (2013.01); *B01J 35/1009* (2013.01); *B01J 35/1014* (2013.01); *B01J 35/1038* (2013.01); *B01J 35/1042* (2013.01); *C01B 3/042* (2013.01); *C01B 17/502* (2013.01); *C01B 2203/0277* (2013.01); *C01B 2203/06* (2013.01); *C01B 2203/1628* (2013.01)

(56) References Cited

U.S. PATENT DOCUMENTS

| | | | |
|---|---|---|---|
| 4,089,940 | A | 5/1978 | Norman et al. |
| 4,314,982 | A | 2/1982 | Norman et al. |
| 2014/0086823 | A1 | 3/2014 | Takeshima et al. |
| 2021/0220806 | A1 | 7/2021 | Upadhyayula et al. |

FOREIGN PATENT DOCUMENTS

| | | |
|---|---|---|
| JP | 2003010692 A | 1/2003 |
| JP | 2013111542 A | 6/2013 |
| JP | 2019514688 A | 6/2019 |
| KR | 20080048784 A | 6/2008 |
| KR | 100860538 B1 | 9/2008 |
| KR | 20140120493 A | 10/2014 |
| WO | 2012091168 | 7/2012 |
| WO | 2012161290 | 11/2012 |

OTHER PUBLICATIONS

International Search Report, dated May 10, 2019 (PCT/US2019/012954).
Daniel M. Ginosar et al., "High-temperature sulfuric acid decomposition over complex metal oxide catalysts", International Journal of Hydrogen Energy, Nov. 23, 2008 (Nov. 22, 2008), vol. 34, pp. 4065-4073 [DOI: 10.1016/j.ijhydene.2008.09.064].
Ln Yannopoulos and Pierre JF, "Hydrogen production process: high temperature-stable catalysts for the conversion of SO3 to SO2", International Journal of Hydrogen Energy, Jan. 1, 1984 (Jan. 1, 1984). vol. 9, Issue No. 5, 10.1016/0360-3199 (84) 90058-2].
M. Roeb et al., "Sulphur based thermochemical cycles: Development and assessment of key components of the process", International Journal of Hydrogen Energy, Aug. 2, 2013 (Feb. 8, 2013), vol. 38, pp. 6195-6204 [https://infoscience.epfl.ch/record/184812/files/Roeb_2013.pdf].
Hiroaki Tagawa et al., "Catalytic Decomposition of Sulfuric Acid Using Metal Oxides as the Oxygen Generating Reaction in Thermochemical Water Splitting Process", Int. J. Hydrogen Energy, vol. 14, No. 1, pp. 11-17, 1989. Printed in Great Britain. Institute of Environmental Science and Technology, Yokohama National University, 156 Tokiwadai, Hodogaya-ku, Yokohama 240,Japan. (Received for publication Aug. 3, 1988).
James W. Funk et al., "Energy Requirements in the Production of Hydrogen From Water", I&EC Process Design and Development, vol. 5, No. 3 Jul. 3, 1966, pp. 336-341.
Minutes of Meeting of Hydrogen and Fuel Cell Technical Advisory Committee Oct. 2-3, 2006 (Oct. 2, Morning Session) Arlington, VA (Crystal Gateway Marriot).
I.P. Jain, "Hydrogen the fuel for 21st century", International Journal of Hydrogen Energy 34 (2009), pp. 7368-7378, International Association for Hydrogen Energy. Published by Elsevier Ltd. [DOI:10.1016/j.ijhydene.2009.05.093].
C. Perkins et al., "Likely near-term solar-thermal water splitting technologies", International Journal of Hydrogen Energy 29 (2004), pp. 1587-1599, International Association for Hydrogen Energy. Published by Elsevier Ltd. [doi:10.1016/j.ijhydene.2004.02.019].
J. Leybros et al., "Plant sizing and evaluation of hydrogen production costs from advanced processes coupled to a nuclear heat source:Part II: Hybrid-sulphur cycle", International Journal of Hydrogen Energy 35 (2010), pp. 1019-1028, Published by Elsevier Ltd. [doi:10.1016/j.ijhydene.2009.11.050].
J.H. Norman et al., "Studies of the Sulfur-Iodine Thermochemical Water-Spliti'ing Cycle", Int. J. Hydrogen Energy, vol. 7. No. 7, pp. 545-556. 1982. Printed in Great Britain. Pergamon Press Ltd.
Masayuki Dokiya et al., "The Study of Thermochemical Hydrogen Preparation. III. An Oxygen-evolving Step through the Thermal Splitting of Sulfuric Acid", Bulletin of the Chemical Society of Japan, vol. 50 (10), pp. 2657-2660.

\* cited by examiner

PROCESS FOR CONVERSION OF SULFUR TRIOXIDE AND HYDROGEN PRODUCTION

TECHNICAL FIELD

The subject matter described herein in general relates a process for conversion of sulphur trioxide to sulphur dioxide and oxygen in presence of a catalyst composition.

BACKGROUND

The world energy demand is continuously growing, and the atmospheric emission of greenhouse gases are rapidly rising due to wide use of carbon containing energy sources causing various global environmental problems. To mitigate these problems, many research programs have been initiated worldwide for the development of the renewable energy resources, such as technologies utilizing solar, wind, tide, nuclear or geological energies. This lead to the introduction of a new and universal energy carrier, i.e., hydrogen [1,2]. Direct splitting of water into hydrogen and oxygen is not practical and also energy demanding. This can be accomplished in multitude of ways to reduce the energy demand and by generating the hydrogen and oxygen in separate places. Collectively these processes are known as thermochemical hydrogen cycle (TC). Some examples of thermochemical cycles are sulfur-iodine cycle process, Westinghouse cycle process, Ispra-Mark 13 cycle process, and Los Alamos science laboratory cycle process [3, 4].

Amongst these cycles, the sulfur-iodine thermochemical cycle originally proposed by General Atomic [5] turned out to be the most promising one due to its higher efficiency. Some plant wide economic analysis shows the sensitivity of thermal energy in the final cost is significant, which can be reduced by improving the catalyst performance alone[6].

U.S. Pat. No. 2,406,930 discloses thermal decomposition of sulfuric acid at very high temperatures to get sulfur dioxide and oxygen. U.S. Pat. No. 3,888,730 discloses the decomposition of sulfuric acid at much lower temperatures than the thermal decomposition when vapors of sulfuric acid are contacted with vanadium catalyst.

U.S. Pat. No. 4,089,940 discloses that the decomposition temperature of sulfuric acid can be reduced by using platinum catalyst. U.S. Pat. No. 4,314,982 discloses platinum catalyst supported on various supports like barium sulphate, zirconia, titania, silica, zirconium silicate and mixtures. These platinum supported catalysts are stable and effective in the low temperature region of the decomposition reaction, i.e. up to 700° C. At temperatures beyond and above 700° C., copper oxide and iron oxide supported on above mentioned supports were used as catalyst. Whole catalytic decomposition of acid occurs in series of beds as low temperature bed with supported platinum catalyst and high temperature bed with less expensive iron or copper oxide supported form. The residence times achieved in these beds are 1.0 s and 0.5 s respectively. The combination of catalysts used for multistage process are capable of carrying out decomposition to $SO_2$ equal to at least about 95% of the equilibrium value for the optimum temperature at a total residence time of not more than 7 seconds.

Korean patent No. 10-0860538 discloses the copper-iron binary oxide catalyst with or without support on alumina and titania. US patent application 20140086823A1, and WO2012/161290A1 disclose a catalyst and process for the decomposition reaction at lower temperatures in the range of 650° C.-800° C. The supported catalyst is composite of metal oxide supported on porous silica. The composite metal oxide including vanadium, tungsten and at least one metal selected from the group consisting of copper (Cu), zirconium (Zr), lanthanum (La), cerium (Ce), neodymium (Nd) and combination thereof. However, the catalysts operate at very low $SO_3$ partial pressures (i.e. 0.045 times to the total pressure) with very high inert carrier gas to provide near equilibrium conversion. However, these catalyst operate at lower flow rates (W/F around $5.6 \times 10^{-5}$ g-h/cm$^3$) causing less throughput and higher operating cost.

Many research groups have proposed a decrease in the decomposition temperature or an increase in the activity of the catalyst comprising of metallic oxide/composite either supported or non supported form [7, 8].

It is very important either to lower the temperature required for the sulfur trioxide decomposition reaction or by increasing the stability along with high activity by using the catalyst which allows sulfur trioxide decomposition reaction proceed at an economical rate for wide range of operating conditions.

SUMMARY

In an aspect of the present disclosure, there is provided a process for conversion of sulphur trioxide to sulphur dioxide and oxygen comprising; placing a catalyst composition in a reactor, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %; passing a flow of sulphur trioxide in the presence of an optionally used carrier gas over the catalyst composition at a temperature of 700-1223 K; and recovering stream comprising of sulphur trioxide, sulphur dioxide, oxygen, water, and the optionally used carrier gas.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF THE DRAWINGS

The above and other features, aspects, and advantages of the subject matter will be better understood with regard to the following description, appended claims, and accompanying drawings where:

DETAILED DESCRIPTION

Figure 1:
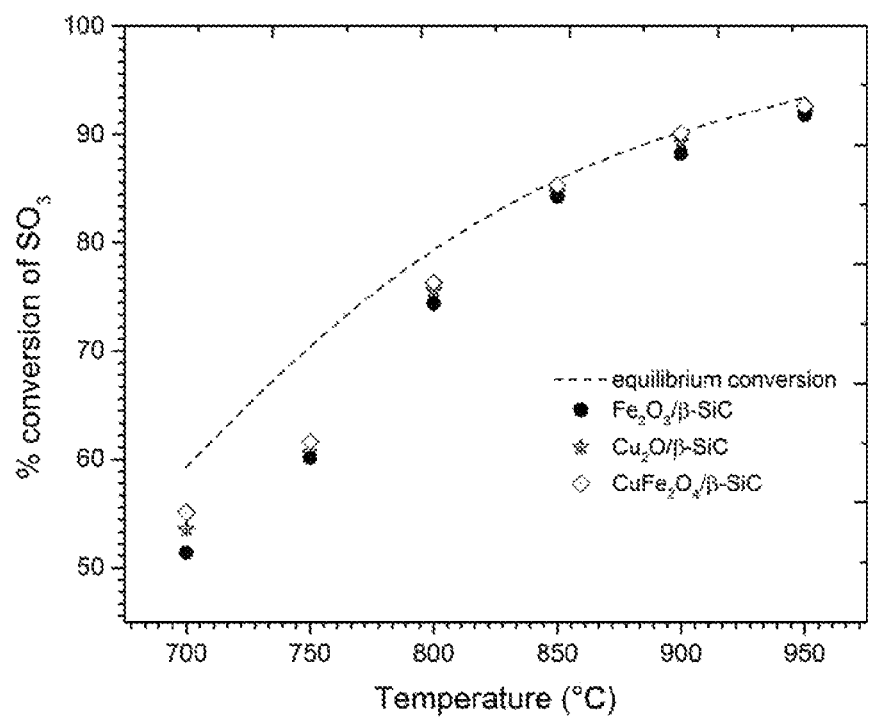
FIG. 1 illustrates the effect of temperature on decomposition of $SO_3$.

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "catalyst composite(s)" and "catalyst composition(s)" are used interchangeably in the present disclosure.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

The disclosure in general relates to a process for catalytic decomposition of sulphuric acid or sulphur trioxide to sulphur dioxide and oxygen in the sulphur-iodine cycle for hydrogen production.

In an embodiment of the present disclosure, there is provided a process for the catalytic decomposition of sulfuric acid wherein sulfuric acid in vapor form is contacted with a catalyst or combination of catalysts, such as metallic oxide catalysts supported on porous β-SiC, at temperature between 700° C. to 950° C. and pressure between 1 bar to 12 bar.

In an embodiment of the present disclosure, there is provided a process for decomposition of sulphuric acid to produce sulphur dioxide in two steps. First step comprises of thermal decomposition of sulphuric acid to sulphur trioxide and water. The second step is the catalytic decomposition of sulphur trioxide to sulphur dioxide and oxygen.

The process for producing hydrogen and oxygen by splitting water can be carried out using any of the given below process,
a. Sulfur-iodine splitting water into hydrogen and oxygen by an S-I cycle process,
b. Westinghouse cycle process,
c. Ispra-Mark 13 cycle process,
d. Los Alamos science laboratory cycle process.

The process of the present disclosure includes decomposing sulphuric acid into water, sulfur dioxide and oxygen through a reaction represented R1. Reaction R1 further split into the elementary reactions R1-1 and R1-2 respectively. Among the elementary reaction, the elementary reaction R1-2 is performed by the process of the present invention for producing sulfur dioxide.

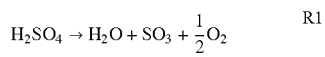  R1

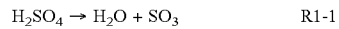  R1-1

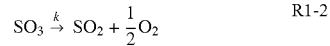  R1-2

Sulfur-iodine cycle:—S-I (sulfur-iodine) cycle process represented by following series of reactions R1 to R3 and overall reaction R5 in which oxygen and hydrogen are produced by step vice manner. The process of the present disclosure for producing hydrogen and oxygen by splitting of water involves the decomposition of sulfuric acid to water, sulfur dioxide and oxygen in step-I. Step-I is further divided into two elementary reactions R1-1 and R1-2. The present process involves the production of sulfur dioxide in the elementary reaction R1-2.

| Step-I | 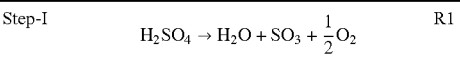 | R1 |
|---|---|---|
|  | 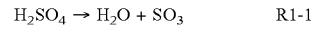 | R1-1 |
|  | 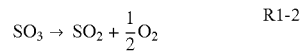 | R1-2 |
| Step-II | $I_2 + SO_2 + 2H_2O \rightarrow 2HI + H_2SO_4$ | R3 |
| Step-III | $2HI \rightarrow H_2 + I_2$ | R4 |
| Overall reaction | 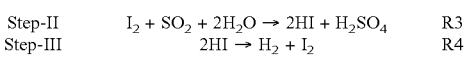 | R5 |

Westinghouse cycle:—In the Westinghouse cycle process represented by the following formulae (R1), (R6) and (R7), the process of the present invention for producing hydrogen and water by splitting of water includes, the decomposition of sulfuric acid to water, sulfur dioxide and oxygen in step-I. Step-I is further divided into two elementary reactions R1-1 and R1-2. The present process involves the production of sulfur dioxide in the elementary reaction R1-2.

| Step-I | 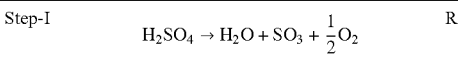 | R1 |
|---|---|---|
|  | 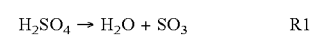 | R1-1 |
|  | 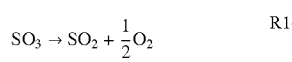 | R1-2 |
| Step-II | $SO_2 + H_2O \rightarrow H_2SO_3$ | R6 |
| Step-III | $H_2SO_3 + H_2O \rightarrow H_2SO_4 + H_2(electrolysis)$ | R7 |
| Overall reaction | 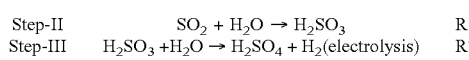 | R5 |

Ispra-Mark 13 cycle:—In the Ispra-Mark 13 cycle process represented by the following formulae (R1), (R8) and (R9) the process of the present invention for producing hydrogen and water by splitting of water includes, the decomposition of sulfuric acid to water, sulfur dioxide and oxygen in step-I. Step-I is further divided into two elementary reactions R1-1 and R1-2. The present process involves the producing of sulfur dioxide in the elementary reaction R1-2.

| Step-I | $H_2SO_4 \to H_2O + SO_3 + \frac{1}{2}O_2$ | R1 |
|---|---|---|
|  | $H_2SO_4 \to H_2O + SO_3$ | R1-1 |
|  | $SO_3 \to SO_2 + \frac{1}{2}O_2$ | R1-2 |
| Step-II | $2HBr \to H_2 + Br_2$ | R8 | material for each is the product of another. In these cycles, heat energy enters through several high temperature chemical reactions. Some amount of heat energy is generated via exothermic low temperature reaction. The inputs for this reaction are water and high temperature heat and these releases low temperature heat, hydrogen, and oxygen. There were no effluents produced in these cycles and all the reagents other than water were recycled and reused. These cycles can be represented in the series of chemical reactions as per their respective cycles. For example in sulfur-iodine cycle process, chemical reactions can be represented as follows.

| Step | Reaction | Temperature (° C.) | ΔH (kJ/mol) | Reaction number |
|---|---|---|---|---|
| I | $H_2SO_4(g) \to H_2O(l) + SO_3(g) + \frac{1}{2}O_2(g)$ | >850° C. | 186.2 (850° C.) | R1 |
|  | $H_2SO_4 \to H_2O + SO_3$ | >350° C. | 97.8 (305° C.) | R1-1 |
|  | $SO_3(g) \to SO_3(g) + \frac{1}{2}O_2(g)$ | 950° C. | 93.2 (950° C.) | R1-2 |
| II | $I_2 + SO_2(g) + 2H_2O(l) \to 2HI(ia) + H_2SO_4$ | 120° C. | −99.5* (200° C.) | R3 |
| III | $2HI(ia) \to H_2(g) + I_2(g)$ | 400° C. | 112.5 (400° C.) | R4 |
| Overall reaction | $H_2O \to H_2 + \frac{1}{2}O_2$ |  | 230-290# | R5 |

*signifies ΔH depends on the dilution of the system. (Typical values are in the range of ~0.35 kJ/mole),
signifies values are depend on upper and lower heating value).

-continued

| Step-III | $Br_2 + SO_2 + 2H_2O \to 2HBr + H_2SO_4$ | R9 |
|---|---|---|
| Overall reaction | $H_2O \to H_2 + \frac{1}{2}O_2$ | R5 |

Los Alamos science laboratory cycle:—In addition, for example, in the Los Alamos science laboratory cycle process represented by the following formulae (R1) and (R9) to (R11). The process of the present disclosure for producing hydrogen and water by splitting of water includes, the decomposition of sulfuric acid to water, sulfur dioxide and oxygen in step-I. Step-I is further divided into two elementary reactions R1-1 and R1-2. The present process involves the production of sulfur dioxide in the elementary reaction R1-2.

| Step-I | $H_2SO_4 \to H_2O + SO_3 + \frac{1}{2}O_2$ | R1 |
|---|---|---|
|  | $H_2SO_4 \to H_2O + SO_3$ | R1-1 |
|  | $SO_3 \to SO_2 + \frac{1}{2}O_2$ | R1-2 |
| Step-II | $Br_2 + SO_2 + 2H_2O \to 2HBr + H_2SO_4$ | R9 |
| Step-III | $2CrBr_3 \to 2CrBr_2 \to Br_2$ | R10 |
| Step-IV | $2HBr + 2CrBr_2 \to 2CrBr_3 + H_2$ | R11 |
| Overall reaction | $H_2O \to H_2 + \frac{1}{2}O_2$ | R5 |

In any thermochemical cycle, hydrogen is produced in a series of chemical reactions designed so that the starting The reaction R1 demands highest energy among the all cycle reactions and for elementary reaction R1-2 heat required at highest temperature. It is very difficult to obtain such high temperatures, moreover material capable of withstanding such higher temperatures are limited and very expensive. Even if attain such higher temperatures, most of the conventional catalysts lose activity.

In an embodiment of the present disclosure, there is provided a process for conversion of sulphur trioxide to sulphur dioxide and oxygen comprising, the process comprising; placing a catalyst composition in a reactor, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %; passing a flow of sulphur trioxide in the presence of an optionally used carrier gas over the catalyst composition at a temperature of 700° C.-950° C.; and recovering stream comprising of sulphur trioxide, sulphur dioxide, oxygen, water, and the optionally used carrier gas.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the transitional metal is selected from the group consisting of Cu, Cr, and Fe.

In an embodiment of the present disclosure, there is provided a process for conversion of sulphur trioxide to sulphur dioxide and oxygen, wherein the catalyst composition comprises an active material selected from the group consisting oxides of Cu, Cr, and Fe; and a support material selected from the group consisting of silica, titania, zirconia, carbides, and combinations thereof, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material comprising of mixed transitional metal oxide selected from the group consisting of binary oxide, a ternary oxide, and a spinel; and a support material selected from the group consisting of silica, titania, zirconia, carbides, and combinations thereof, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material comprising an oxide of Cu; and a support material selected from the group consisting of silica, titania, zirconia, carbides, and combinations thereof, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material comprising an oxide of Cr; and a support material selected from the group consisting of silica, titania, zirconia, carbides, and combinations thereof, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material comprising an oxide of Fe; and a support material selected from the group consisting of silica, titania, zirconia, carbides, and combinations thereof, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material comprising binary oxide of Cu, and Fe in the molar ratio of 1:2; and a support material selected from the group consisting of silica, titania, zirconia, carbides, and combinations thereof, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material comprising an oxide of Cu, and Fe with a spinel structure; and a support material selected from the group consisting of silica, titania, zirconia, carbides, and combinations thereof, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material comprising an oxide of Cu, and Cr with a spinel structure; and a support material selected from the group consisting of silica, titania, zirconia, carbides, and combinations thereof, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the support material has a pore volume in the range of 0.05 to 0.9 cc/g.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the support material has a pore volume in the range of 0.1 to 0.7 cc/g In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the support material has active surface area in the range of 5-35 $m^2/g$.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the support material has specific surface area as determined by BET multipoint nitrogen adsorption method is in the range of 2 to 200 $m^2/g$.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the support material has specific surface area as determined by BET multipoint nitrogen adsorption method is in the range of 5 to 100 $m^2/g$.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the support material has specific surface area as determined by BET multipoint nitrogen adsorption method is in the range of 5 to 60 m²/g.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the catalyst composition has transitional metal content in the range of 0.1 to 20 wt %.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the catalyst composition has transitional metal content in the range of 0.1 to 20 wt %, wherein the catalyst composition has transitional metal content in the range of 2 to 10 wt %

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the active material size is in the range of 0.1 to 25 mm.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material selected from the group consisting of silica, titania, zirconia, carbides, and combinations thereof, wherein the active material to the support material weight ratio is in the range of 0.1 to 25 wt %, wherein the active material size is in the range of 0.1 to 15 mm.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material comprising porous β-silicon carbide (β-SiC) or silicate porous silicon carbide (β-SiC(PT)), wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material comprising crystallized porous A-SiC or silicated porous silicon carbide (β-SiC(PT)), wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material comprising crystallized porous β-SiC or silicated porous silicon carbide (β-SiC(PT)) in the form of spheres pellets, extrudates or foam, wherein the active material to the support material weight ratio is in the range of 0.1 to 25 wt %.

In an embodiment of the present disclosure, there is provided a process for conversion of sulphur trioxide to sulphur dioxide and oxygen, wherein the catalyst composition comprises an active material selected from the group consisting of transitional metal oxide, mixed transitional metal oxide, and combinations thereof; and a support material comprising crystallized porous β-SiC or silicated porous silicon carbide (β-SiC(PT)) in the form of spheres pellets, extrudates or foam, wherein the active material to the support material weight ratio is in the range of 0.1 to 25 wt %, wherein the transitional metal is selected from the group consisting of Cu, Cr, and Fe, wherein the support material has a pore volume in the range of 0.05 to 0.9 cc/g, wherein the support material has active surface area in the range of 5-35 m²/g, wherein the support material has specific surface area as determined by BET multipoint nitrogen adsorption method is in the range of 2 to 200 m²/g, wherein the catalyst composition has transitional metal content in the range of 0.1 to 20 wt %.

In an embodiment of the present disclosure, there is provided a process for conversion of sulphur trioxide to sulphur dioxide and oxygen, wherein the catalyst composition comprises copper and iron oxides in the molar ratio of 1:2 either in bimetallic form or in spinel form or alone employed as a supported catalyst effectively decompose $H_2SO_4$ to near equilibrium conversion at a pressure in the range of 0.1 to 30 bar and temperature in the range of 700 to 1223 K. The above mentioned active material supported on silicate crystalline porous β-SiC (β-SiC(PT) surprisingly retains its inertness and structural integrity without any thermal gradients and can be an effective substrate. The substrate or support structure chosen from the group consisting of powders, particles, pellets, granules, spheres, beads, pills, balls, noodles, cylinders, extrudates and trilobes.

When the active materials of the present disclosure are used as a supported catalyst, the support must be able to continue to function under sulphuric acid vapour atmosphere with sufficient mechanical strength to withstand high pressures and temperatures and permit a high flow rate of reactant and product gases. The most important function of the support is to minimize the rate of growth of migration of crystallites of the active components dispersed on the surface. These are inevitable if the catalysts are operated at high temperature, because caking of support gradually diminishes its role as a dispersant, which adversely affects the activity of the catalyst. Additionally, it is also important that the catalyst support must be inert, and capable of retaining its mechanical strength, structural integrity in the corrosive sulphuric acid vapour environment along with good thermal stability at the temperature and pressure range of the reaction.

It has been found that a number of usual oxide support materials such as alumina, titania employed in catalyst systems do not exhibit a commercially practical life between 700° C. to 900° C. Moreover, operation at lower end of the temperature range is often particularly detrimental to the substrate and operating at higher end is dangerous for the active metallic oxides due to sintering. It has been surprisingly found that loading of active material on pretreated porous β-SiC or silicated porous β-SiC (β-SiC(PT)) exhibits good stability, inertness and effectiveness. Moreover, the catalyst is more economical and there will be few thermal gradients within the economical operational range.

Maximizing the surface area is very important in a catalytic reaction. In an embodiment of the present disclosure, there is provided a catalyst composition for conversion of sulphur trioxide to sulphur dioxide and oxygen comprising iron and copper oxide mixture in the form of bimetallic oxide mixture is dispersed upon the support in an amount less than about 25 w/w (weight percent).

In an embodiment of the present disclosure, there is provided a process for conversion of sulphur trioxide to sulphur dioxide and oxygen, wherein the catalyst composition comprises an iron and copper oxide mixture in the spinel form is dispersed upon the support in an amount between 3-15% (weight percent) based on the support weight. At a level of 7-11% of the active copper-iron spinel (weight percent based on the support weight), the surface area of the catalyst would be at least 10 m$^2$/g of the catalyst.

The catalyst composition can be employed in a fixed bed, or a part of the single bed either in single stage or multistage operation or in dynamic bed, e.g. moving bed/fluidized bed using any form of the catalyst. The sulphuric acid vapour passed through the bed can be maintained at desired range of 700° C. to 900° C.

According to some embodiments, the divided catalyst structures have a diameter or longest characteristic dimension of about 0.25 mm to about 12.7 mm (about 1/100" to about ½"), preferably, between about 0.5 mm and about 4.0 mm. In other embodiments they are in the range of about 50 microns to 6 mm.

Most of the known metal oxide catalysts are active at high temperature and cause sintering and after prolonged period of activity. The catalyst prepared according to the present invention is excellent in the activity and stability when tested for a long time in the temperature ranges of 700° C.-1200° C. more preferably between 700° C.-900° C. and pressure ranges of 0.1-30 bar more preferably between 1-20 bar for the decomposition of sulphuric acid and more precisely $SO_3$ conversion to $SO_2$ and $O_2$ in the sulphur-iodine cycle. According to the present invention, the space velocities of sulphuric acid at atmospheric conditions in the reactor is maintained anywhere between (100-500,000) ml/g-catalyst-hr., preferably 500-72,000 ml/g·cat·hr. are suitable. All experiments are carried out in the presence of inert gas of nitrogen.

It has been found that the metallic oxides, i.e. copper and iron oxides in the molar ratio of 1:2 either in bimetallic form or in spinel form or alone employed as a supported catalyst effectively decompose $H_2SO_4$ to near equilibrium conversion for wide range of pressures (0.1 to 30 bar) and temperatures (750 K to 1173 K). When the above said active material supported on crystalline porous β-SiC carbide it will retain it inertness and structural integrity without any thermal gradients, thereof have proved to be effective substrate. Here, the substrate or support may be in the form of powder, pellet, extrudates, monolith or foam.

It has been found that a number of usual oxide support materials such as alumina, titania employed in catalyst systems do not exhibit a commercially practical life between 700° C. to 950° C. and in the environment and thus are not considered suitable. Moreover, operation at lower end of the temperature range is often particularly detrimental to the substrate and operating at higher end is dangerous for the active metallic oxides due to sintering. However, it has been found that loading of active material on porous β-SiC exhibits good stability, inertness and effectiveness. Moreover, the catalyst is more economical and there will be few thermal gradients within the economical operational range.

The effectiveness of the aforementioned catalysts are such that if the process operated at 850° C., conversion is about 85% of the incoming sulfuric acid to $SO_2$ can be achieved at residence time, 1 to 0.5 sec. respectively. The catalysts used for the multistage process are capable of carrying out decomposition to $SO_2$ equal to at least about 95% of the equilibrium value for the ultimate temperature at a residence time of not more than 5 seconds.

Although the subject matter has been described in considerable detail with reference to certain embodiments thereof, other embodiments are possible.

EXAMPLES

The following examples are given by way of illustration of the present invention and should not be construed to limit the scope of present disclosure. It is to be understood that both the foregoing general description and the following detailed description are exemplary and explanatory only and are intended to provide further explanation of the claimed subject matter.

Example 1(a)

Pre-Treatment of Catalyst Support

A catalyst support was obtained by using a synthesis method termed the pre-treatment method (PTM). Silicon carbide (β-SiC) extrudates (2 mm diameter) were supplied by SICAT Sarl (France) and here onwards noted as β-SiC(R) or β-SiC as received. β-SiC(R) samples were etched with a 1:1 HF solution in water for 3-5 minutes under sonication at room temperature in order to remove $S_tO_xC_y/S_tO_z$ from the surface of the β-SiC. The samples were filtered and washed with plenty of deionized water until the filtrate pH value reached between 6.5 to 7 and then sample were dried at 120° C. under vacuum for 3 to 5 h, here onwards noted as β-SiC(P) or simply silica free β-SiC. Subsequently dried sample (β-SiC(P)) was oxidized in atmospheric air between 700-1000° C. for a period of 2-6 h to obtain the pre-treated β-SiC or simply β-SiC(PT).

Example 1(b)

Preparation of a Catalyst $Fe_2O_3$/β-SiC(R) (for Comparison)

1.713 g of Iron precursor (ammonium iron citrate) dissolved in 10 ml of distilled water and then to 10 g of pre dried and degassed β-SiC(R) extrudates of 2 mm size were added. Then, the resulting mixture was sonicated for about 30 min such that whole β-SiC(R) completely dipped into the solution. After half an hour β-SiC(R) was separated from the solution and dried at 80° C. for 30 min and then again added to the remaining solution, so that the whole iron solution was absorbed by β-SiC(R). Finally, the impregnated substrate was air dried at 100° C. for 1 h and then calcined at 500° C. for 2 h. The final catalyst is 5% $Fe_2O_3$ supported on β-SiC(R). 2 to 15% (w/w) of supported iron oxide catalysts were also prepared by similar approach.

Example 1(c)

Preparation of a Catalyst $Fe_2O_3$/β-SiC(P)

$Fe_2O_3$ supported β-SiC(P) was prepared with same protocol used in Example 1(b), where β-SiC(P) support was used in the place of β-SiC(R) support in the example.

Example 1(d)

Preparation of a Catalyst $Fe_2O_3$/β-SiC(PT) (for Comparison)

$Fe_2O_3$ supported β-SiC(PT) was prepared with same protocol used in the Example 1(b), where β-SiC(PT) support used in the place of β-SiC(R) support.

Example 2(a)

Preparation of a Catalyst $Cu_2O$/β-SiC(R) (for Comparison)

1.8741 g of copper precursor $(Cu(NO_3)_2.3H_2O)$ dissolved in 10 ml of distilled water and then to 10 g of pre dried and degassed β-SiC(R) extrudates of 2 mm size were added. Then, the resulting mixture was sonicated for about 30 min such that whole β-SiC(R) completely dipped into the solution. After half an hour β-SiC(R) is separated from the solution and dried at 80° C. for 30 min and then again added to the remaining solution, so that the whole copper solution was absorbed by β-SiC(R). Finally, the impregnated substrate was air dried at 100° C. for 1 h and then calcined at 500° C. for 2 h. The final catalyst is 5% $Cu_2O$ supported on β-SiC(R). 2 to 15% (w/w) of supported copper(I) oxide catalysts were also prepared by similar approach.

Example 2(b)

Preparation of a Catalyst $Cu_2O$/β-SiC(PT) (for Comparison)

5% $Cu_2O$/β-SiC(PT) catalyst was prepared with same protocol used in Example 1(b), where β-SiC(PT) support used in the place of β-SiC(R) support in the example. Using similar approach 2 to 15% (w/w) of supported copper (I) oxide catalysts over β-SiC(PT) support were also prepared.

Example 3(a)

Preparation of a Catalyst $Cr_2O_3$/β-SiC(R) (for comparison)

1.101 g of Ammonium chromate $(Cu(NO_3)_2.3H_2O)$ dissolved in 10 ml of distilled water and then to 10 g of pre dried and degassed β-SiC(R) extrudates of 2 mm size were added. Then, the resulting mixture was sonicated for about 30 min such that whole β-SiC(R) completely dipped into the solution. After half an hour β-SiC(R) was separated from the solution and dried at 80° C. for 30 min and then again added to the remaining solution, so that the whole ammonium chromate solution was absorbed by β-SiC(R). Finally, the impregnated substrate was air dried at 100° C. for 1 h and then calcined at 500° C. for 2 h. The final catalyst was 5% $Cr_2O_3$ supported on β-SiC(R). 2 to 15% (w/w) of supported chromium (III) oxide catalysts over β-SiC(R) support were also prepared by similar approach.

Example 3(b)

Preparation of a Catalyst $Cr_2O_3$/β-SiC(PT) (for Comparison)

5% $Cr_2O_3$/β-SiC(PT) catalyst was prepared with same protocol used in Example 3(a), where β-SiC(PT) support used in the place of β-SiC(R) support. Using similar approach 2 to 15% (w/w) of supported $Cr_2O_3$ catalysts supported over β-SiC(PT) were also are prepared.

Example 4(a)

Preparation of a Catalyst $CuFe_2O_4$/β-SiC(R)

1.176 g of ammonium nitrate $(Fe(NO_3).9H_2O)$ and 0.5049 g of copper nitrate $(Cu(NO_3)_2.3H_2O)$ dissolved in 15 ml of distilled water and then to 10 g of pre dried and degassed β-SiC(R) extrudates of 2 mm diameter were added. Then the resulting mixture was sonicated for about 30 min such that whole β-SiC(R) completely dipped into the solution. After half an hour β-SiC was separated from the solution and dried at 80° C. for 30 min and then again added to the remaining solution, so that the whole solution was absorbed by β-SiC(R). Finally, the impregnated substrate was air dried at 100° C. for 1 h and then calcined at 500° C. for 2 hrs. Then, the temperature of the furnace was gradually raised to 1000° C. and kept at 1000° C. for 3 h with intermediate mixing of solids. The obtained catalyst was 5% $CuFe_2O_4$ supported on β-SiC(R) catalyst.

Example 4(b)

Preparation of a Catalyst $CuFe_2O_4$/β-SiC(P)

5% $CuFe_2O_4$/β-SiC(P) catalyst was prepared using the same protocol as used in the example 4(a), where β-SiC(P) was used as support instead of β-SiC(R) in the example. 2 to 15% (w/w) of $CuFe_2O_4$/β-SiC(P) catalysts were also prepared by similar approach.

Example 4(c)

Preparation of a Catalyst $CuFe_2O_4$/β-SiC(PT)

5% $CuFe_2O_4$/β-SiC(PT) catalyst was prepared using the same protocol as used in the example 4(a), where β-SiC(PT) was used as support instead of β-SiC(R). 2 to 15% (w/w) of $CuFe_2O_4$/β-SiC(PT) catalysts were prepared by similar approach.

Example 5(a)

Preparation of a Catalyst $CuCr_2O_4$/β-SiC(R)

An aqueous solution of chromium anhydride and copper nitrate were impregnated using the pore volume method or dry impregnation method into the β-SiC(R). In this method, 6 ml aqueous solution of chromium anhydride and copper nitrate (stoichiometric proportional) were added to 10 g of β-SiC(R) and then the solid was left to mature for 12 hours. The solid was then oven dried at 120° C. for twelve hours, and calcined for three hours at 900° C. in a stream of dry air (1 l/h·g of catalyst) to obtain the $CuCr_2O_4$/β-SiC(R).

Example 5(b)

Preparation of a Catalyst $CuCr_2O_4$/β-SiC(PT)

$CuCr_2O_4$/β-SiC(PT) catalyst was prepared using the same protocol as used in the example 5(a), where β-SiC(PT) was used as support instead of β-SiC(R). 2 to 15% (w/w) of CuCr$_2$O$_4$/β-SiC (PT) catalysts were prepared by similar approach.

Example 6(a)

Preparation of a Catalyst FeCr$_2$O$_4$/β-SiC(R)

An aqueous solution of chromium anhydride and iron nitrate were impregnated using the pore volume method or dry impregnation method into the β-SiC(R). In this method, 6 ml aqueous solution of chromium anhydride and iron nitrate (stoichiometric proportional) were added to 10 g of β-SiC(R) and then the solid was left to mature for 12 hours. The solid was then oven dried at 120° C. for twelve hours, and calcined for three hours at 900° C. in a stream of dry air (1 l/h·g of catalyst) to obtain the FeCr$_2$O$_4$/β-SiC(R).

Example 6(b)

Preparation of a Catalyst FeCr$_2$O$_4$/β-SiC(PT)

FeCr$_2$O$_4$/β-SiC(PT) catalyst was prepared using the same protocol as used in the example 6(a), where β-SiC(PT) was used as support instead of β-SiC(R).

Example 7

Preparation of a Catalyst CuFe$_2$O$_4$/Al$_2$O$_3$ 1.176 g of ammonium nitrate (Fe(NO$_3$).9H$_2$O) and 0.5049 g of copper nitrate (Cu(NO$_3$)$_2$.3H$_2$O) dissolved in 15 ml of distilled water and then to 10 g of pre dried and degassed alumina extrudates of 1 mm diameter were added. Then the resulting mixture was sonicated for about 30 min such that whole alumina completely dipped into the solution. After half an hour alumina was separated from the solution and dried at 80° C. for 30 min and then again added to the remaining solution, so that the whole solution was absorbed by alumina. Finally, the impregnated substrate was air dried at 100° C. for 1 h and then calcined at 500° C. for 2 hrs. Then the resulting calcined material temperature was raised to 1000° C. gradually and heated for 3 h with intermediate mixing. The obtained catalyst was 5% CuFe$_2$O$_4$ supported on Alumina (Al$_2$O$_3$) catalyst.

Example 8

Preparation of a Catalyst Fe$_2$O$_3$/Al$_2$O$_3$ 1.713 g of Iron precursor (ammonium iron citrate) dissolved in 10 ml of distilled water and then to 10 g of pre dried and degassed alumina extrudates of 1 mm diameter were added. Then, the resulting mixture was sonicated for about 30 min such that whole alumina completely dipped into the solution. After half an hour alumina extrudates were separated from the solution and dried at 80° C. for 30 min and then again added to the remaining solution, so that the whole iron solution was absorbed by alumina extrudates. Finally, the impregnated substrate was air dried at 100° C. for 1 h and then calcined at 500° C. for 2 h. The final catalyst was 5% Fe$_2$O$_3$ supported on Al$_2$O$_3$. 2 to 15% (w/w) of supported iron oxide and copper oxide catalysts supported over alumina were also prepared by similar approach.

Example 9(a)

Preparation of CoFe$_2$O$_4$ Catalyst.

In a typical procedure 0.20M Fe(NO$_3$)$_3$ solution was mixed together with 0.10M Co(NO$_3$)$_2$ solution. Then, an appropriate amount of a 6M NaOH solution was added to the mixed solution to adjust the pH to 8-14 and de-ionized water was added to the resulting solution until the volume of the solution was about 160 ml. The mixture was stirred strongly for 30 minute and then transferred into a 300 ml Teflon-lined autoclave. The autoclave was sealed and maintained at 200° C. for 48 h. After the reaction was completed, the resulting solid product was filtered and washed with water and absolute alcohol several times. Finally the filtered sample was dried 120° C. for 4 h to obtain the CoFe$_2$O$_4$ spinel catalyst.

Example 9(b)

Preparation of a Catalyst CoFe$_2$O$_4$/β-SiC (PT).

1.135 g ammonium ferric citrate was dissolved in 10 ml distilled water and 10 g of pre dried and degassed β-SiC(PT) extrudates of 2 mm diameter were added. Then the resulting mixture was sonicated for about 30 min such that whole β-SiC (PT) completely dipped into the solution. After half an hour β-SiC extrudates were separated from the solution and dried at 80° C. for 30 min and then again added to the remaining solution, so that the whole solution is absorbed by β-SiC(PT). Then the sample was dried for 5 h in air and calcined at 400° C. in furnace for 3 h. Then again sample was removed from the furnace and cooled to room temperature for sub sequent impregnation with the 10 ml cobalt nitrate solution (0.619 g of Co(NO$_3$)$_2$.6H$_2$O in 10 ml water). Again same procedure was repeated and calcined at 900° C. temperature for 3 h and after furnace temperature was gradually raised to 1000° C. for completion of solid state reaction for 4 h. The resulting catalyst was noted as CoFe$_2$O$_4$/β-SiC(PT).

Example 10(a)

Preparation of NiFe$_2$O$_4$ Catalyst

NiFe$_2$O$_4$ catalyst was prepared by hydrothermally by mixing equal volumes of Ni(NO$_3$)$_2$.6H$_2$O and Fe(NO$_3$)$_3$.9H$_2$O solutions in the molar ration of 1:2 (i.e. 0.10M, 0.2M respectively). A solution of 6M NaOH was added to the mixed salt solution by drop-wise until the final pH value attained a designated value to form an admixture. The admixture was transferred into a Teflon autoclave (300 ml) with a stainless steel shell, and a little de-ionized water was added into the Teflon autoclave up to 80% of the total volume. The autoclave was heated to 200° C. for 48 h and allowed to cool to room temperature naturally. The final product was filtered and washed with de-ionized water and pure alcohol for several times to remove possible residues and then dried at 120° C. for 4 h to obtain NiFe$_2$O$_4$ catalyst

Example 10(b)

Preparation of NiFe$_2$O$_4$/β-SiC(PT) Catalyst

Ammonium iron citrate (1.135 g in 10 ml) and nickel nitrate solution (0.619 g Ni(NO$_3$)$_2$.6H$_2$O in 10 ml water) were sequentially deposited one by one as given in the example 9(b) on β-SiC(PT) extrudates. After calcination in air samples temperature was kept at 900° C. for completion of solid state reaction between Nickel and iron(III) oxides to from nickel ferrite crystal of the support. Thus the catalyst formed was noted as NiFe$_2$O$_4$ supported over β-SiC(PT).

Example 11(a)

Preparation of $ZnFe_2O_4$ Catalyst $ZnFe_2O_4$ spinel were prepared by using the hydrothermal method in which stoichiometric amounts of zinc and iron nitrates were dissolved in deionized water. Then an appropriate amount 6M NaOH solution was added to the salt solution to adjust the pH=10-12. Then the resulting mixture was transferred into a Teflon stainless steel autoclave and temperature was maintained at 200° C. for 24 h. After the reaction was completed, the resulting solid product was filtered and washed with plenty of water and alcohol several times. Finally filtered sample was air dried at 120° C. for 4 h to obtain the $ZnFe_2O_4$ spinel catalyst.

Example 11(b)

Preparation of $ZnFe_2O_4/\beta$-SiC(PT) Catalyst 10 ml of ammonium ferric citrate (0.1104M) was added to 10 g of β-SiC(PT) extrudates. Then the resulting mixture was shaken for few minutes such that the whole Ceramic just dipped into the solution and left for half an hour. After that silicon carbide extrudates were separated from the remaining solution and dried at 80° C. in oven for 2 h and then again added to the remaining solution so that the whole iron solution is absorbed by β-SiC(PT) extrudates. The impregnated supported catalyst was first dried at 100° C. for two hours and calcined at 400° C. in muffle furnace for 3 h and cooled to room temperature. Again same procedure was repeated with 10 ml zinc nitrate solution (0.615 g in 10 ml water). Finally catalyst was calcined at 900° C. for 2 h and then temperature gradually increased to 1000° C. in furnace for 3 h to complete final solid state reaction to obtain $ZnFe_2O_4$ supported over β-SiC(PT).

Example 12(a)

Preparation of a Catalyst $NiCr_2O_4$ $NiCr_2O_4$ catalysts were synthesized via solid state route using NiO and α-$Cr_2O_3$ as starting materials. 1:1 molar mixture of NiO and α-$Cr_2O_3$ samples were thoroughly mixed using mortar and pestle and heated to 650° C. 6 h and then gradually heated to 900° C. in 12 h to complete the homogeneous reaction between the two oxides with intermediate mixing. Finally the samples were further kept 900° C. for 5 h to obtain the $NiCr_2O_4$ catalyst.

Example 12(b)

Preparation of a Catalyst $NiCr_2O_4/\beta$-SiC(PT)

An aqueous solution of chromium anhydride and nickel nitrate were impregnated using the pore volume method or dry impregnation method into the β-SiC(PT). In this method, 6 ml aqueous solution of chromium anhydride and nickel nitrate (stoichiometric proportional) were added to 10 g of β-SiC(PT) and then the solid was left to mature for 12-hours. The solid was then oven dried at 120° C. for twelve hours, and calcined for three hours at 900° C. in a stream of dry air (1 l/h·g of catalyst) to obtain the $NiCr_2O_4/$β-SiC(PT).

Example 13(a)

Preparation of a Catalyst $ZnCr_2O_4$ 0.025 mole of $Zn(NO_3)_2.6H_2O$ and 0.05 mole of $Cr(NO_3)_3.9H_2O$ was dissolved in 90 ml distilled water to form a clear aqueous solution. 4M NaOH solution was slowly dropped into the aqueous solution vigorously stirred to adjust the pH 7-12 to obtain the suspension. The obtained suspension was transferred into Teflon-lined 300 ml capacity autoclave and heated to 200° C. for 48 h. Then the product was filtered and washed with plenty of deionised water and alcohol. Then the washed product was dried at 120° C. for 4 h to obtain the green powder ($ZnCr_2O_4$).

Example 13(b)

Preparation of $ZnCr_2O_4/\beta$-SiC(PT) Catalyst

An aqueous solution of chromium anhydride and nickel Zinc nitrate were impregnated using the pore volume method or dry impregnation method into the β-SiC(PT). In this method, 6 ml aqueous solution of chromium anhydride and zinc nitrate (stoichiometric proportional) were added to 10 g of β-SiC(PT) and then the solid was left to mature for 12 hours. The solid was then oven dried at 120° C. for twelve hours, and calcined for three hours at 900° C. in a stream of dry air (1 l/h·g of catalyst) to obtain the $ZnCr_2O_4/$β-SiC(PT).

Example 14

Preparation of $Cr_2O_3$ Catalyst

Chromium (III) oxide catalyst was prepared by mixing the chromium sulphate with 3% wt % polyvinyl alcohol and was made into spherical pellets. These pellets were calcined at 1000° C. for 5 h in air to decompose into chromium oxide.

Example 15

Preparation of $Cu_2O$ Catalyst

Cuprous oxide was prepared by mixing the copper sulphate with 3% wt % polyvinyl alcohol and was made into spherical pellets. These pellets were calcined at 1000° C. for 5 h in air to decompose into Copper (I) oxide.

Example 16(a)

Preparation of a Catalyst $Pt/Al_2O_3$.

An aqueous solution of chloroplatinic acid was impregnated using the pore volume method or dry impregnation method into the Alumina ($Al_2O_3$). The platinum (Pt) concentration in the solution was calculated to obtain the desired Pt content on the support, then the solid was left to mature for 12 hours. The solid was then oven dried at 120° C. for twelve hours, and calcined for three hours at 500° C. in a stream of dry air (1 l/h·g of catalyst) and reduced at 350° C. in stream of 10% hydrogen gas in Nitrogen (1 l/h·g of catalyst) for 3 h to obtain the 1% $Pt/Al_2O_3$.

Example 16(b)

Preparation of a Catalyst Pt/β-SiC(PT)

An aqueous solution of chloroplatinic acid was impregnated using the pore volume method or dry impregnation method into the silicon carbide (β-SiC(PT)). The platinum (Pt) concentration in the solution was calculated to obtain the desired Pt content on the support, then the solid was left to mature for 12 hours. The solid was then oven dried at 120° C. for twelve hours, and calcined for three hours at 500° C. in a stream of dry air (1 l/h·g of catalyst) and reduced at 350° C. in stream of 10% hydrogen gas in Nitrogen (1 l/h·g of catalyst) for 3 h to obtain the 1% Pt/β-SiC(PT).

Example 17

Preparation of CuFeCrO$_b$/β-SiC(PT) catalyst

An aqueous solution of chromium anhydride, iron ammonium citrate and copper nitrate were impregnated using the pore volume method or dry impregnation method into the β-SiC(PT). In this method, 6 ml aqueous solution of chromium anhydride, ammonium iron citrate and copper nitrate in the molar ratio of 1:1:1 (stoichiometric proportional) were added to 10 g of β-SiC(PT) and then the solid was left to mature for 12 hours. The solid was then oven dried at 120° C. for twelve hours, and calcined for 5 hours at 900° C. in a stream of dry air (1 l/h·g of catalyst) to obtain the CuFeCrO$_b$/β-SiC(PT) in which elemental ratio of Cu:Fe:Cr was found to be 1:1:1.

Example 18

Preparation of CuFeCrO$_c$/β-SiC(PT) catalyst

An aqueous solution of copper nitrate, iron ammonium citrate and chromium anhydride were impregnated using the pore volume method or dry impregnation method into the β-SiC(PT). In this method, 6 ml aqueous solution of copper nitrate, iron ammonium citrate and chromium anhydride in the molar ratio of 1:1:4 (stoichiometric proportional) were added to 10 g of β-SiC(PT) and then the solid was left to mature for 12 hours. The solid was then oven dried at 120° C. for twelve hours, and calcined for 5 hours at 900° C. in a stream of dry air (1 l/h·g of catalyst) to obtain the CuFeCrO$_b$/β-SiC(PT) in which elemental ratio of Cu:Fe:Cr was found to be 1:1:4.

Example 19 (Activity Test of the Prepared Catalysts)

Method 1: Catalyst obtained from the above examples are tested in a fixed bed reactor as mentioned below. 1 g of catalyst is loaded into the middle of the glass tube reactor and preheated $N_2$ inert gas along with the liquid $H_2SO_4$ (98 wt %) along with $N_2$ inert gas was pumped through a syringe pump to the primary decomposer, where the temperature was maintained at 700° C. The space velocity of sulfuric acid is maintained between 500 ml/g·catalyst-hr and 50,000 ml/g catalyst-hr. The reactor temperature is kept between 700° C. and 950° C. and pressure is kept at atmospheric pressure. For high pressure experiments (i.e. pressure between 1 to 20 bar) Hastelloy reactor is was used. The decomposed products (traces of $H_2SO_4$, $SO_3$, $H_2O$, $SO_2$ and $O_2$) over the catalyst were passed through a series of absorbers where all gases are absorbed for quantitative analysis except $N_2$ and $O_2$. The unabsorbed oxygen gas is quantified using gas chromatograph and oxygen analyzer.

Method 2: Catalyst obtained from the above examples 1 to 6 are tested in a dual stage fixed bed reactor. In a typical experiment, liquid sulfuric acid at room temperature is fed to the first stage decomposer by means of a syringe pump at defined flow rate along with inert carrier gas nitrogen through mass flow controller (MFC). The $1^{st}$ stage is maintained at 700° C. throughout the experiment to ensure complete decomposition of sulfuric acid. Thermally decomposed $SO_3$, $H_2O$ and $N_2$ flows through hot ceramic beads which act as a preheating section before reaching the catalyst bed in the $2^{nd}$ stage reactor. The catalytically decomposed products ($SO_2$, $O_2$, $H_2O$, $N_2$ and un-decomposed $SO_3$) were cooled and are trapped in two bottles connected in series, which are filled with $I_2/I^-$ aqueous solution to measure the concentration of $SO_3$ and $SO_2$. Unabsorbed gases are analyzed in a gas chromatograph (NUCON, Model 5765, equipped with TCD and GC column packed with carbosphere) and an online oxygen analyzer.

TABLE 1

Activity test of various supported catalysts in sulphuric acid decomposition reaction.

| Example | Catalyst | % of conversion (decomposition) | | | | |
|---|---|---|---|---|---|---|
| | | 750° C. | 800° C. | 850° C. | 900° C. | 950° C. |
| 1(a) | β-SiC(R) | 8.8 | 11.8 | 30.1 | 35.4 | 56.3 |
| | β-SiC(P) | 7.6 | 12 | 28.8 | 35.0 | 56.9 |
| | β-SiC(PT) | 9 | 12 | 30 | 36 | 57.1 |
| 1(b) | Fe$_2$O$_3$/β-SiC(R) | 18.1 | 29.4 | 68.3 | 79.2 | 87.6 |
| 1(c) | Fe$_2$O$_3$/β-SiC(P) | 17.2 | 28.1 | 65.9 | 78.5 | 82.1 |
| 1(d) | Fe$_2$O$_3$/β-SiC(PT) | 20 | 34 | 72 | 83.0 | 87.6 |
| 2(a) | Cu$_2$O/β-SiC(R) | 18.4 | 45.2 | 69.6 | 82.3 | 86.7 |
| 2(b) | Cu$_2$O/β-SiC(PT) | 21 | 49 | 73.5 | 84.2 | 88.5 |
| 3(b) | Cr$_2$O$_3$/β-SiC(PT) | 19.5 | 48.3 | 74.1 | 84.0 | 88.1 |
| 4(a) | CuFe$_2$O$_4$/β-SiC(R) | 19.3 | 46.2 | 71.4 | 82.7 | 84.8 |
| 4(b) | CuFe$_2$O$_4$/β-SiC(P) | 18.7 | 45.1 | 70.9 | 80.6 | 82.1 |
| 4(c) | CuFe$_2$O$_4$/β-SiC(PT) | 23 | 52 | 74.7 | 88.5 | 91.0 |
| 5(a) | CuCr$_2$O$_4$/β-SiC(R) | 20.9 | 53.2 | 71.6 | 86.2 | 88.9 |
| 5(b) | CuCr$_2$O$_4$/β-SiC(PT) | 23.5 | 55 | 76.5 | 89 | 92.6 |
| 6(a) | FeCr$_2$O$_4$/β-SiC(R) | 20.6 | 53.2 | 74.2 | 85.3 | 88.6 |
| 6(b) | FeCr$_2$O$_4$/β-SiC(PT) | 22.5 | 54 | 77 | 88 | 91.9 |
| 7 | CuFe$_2$O$_4$/Al$_2$O$_3$ | 15.2 | 38.0 | 60.5 | 71.1 | 86.0 |
| 8 | Fe$_2$O$_3$/Al$_2$O$_3$ | 16.0 | 36.5 | 57 | 68.5 | 83.2 |
| 9(a) | CoFe$_2$O$_4$ | 15.4 | 22.3 | 58.9 | 67.7 | 77.3 |
| 9(b) | CoFe$_2$O$_4$/β-SiC(PT) | 18.4 | 24.8 | 62.7 | 75.4 | 80.8 |
| 10(a) | NiFe$_2$O$_4$ | 14.9 | 20.5 | 48.1 | 54.4 | 58.4 |
| 10(b) | NiFe$_2$O$_4$/β-SiC(PT) | 14.2 | 20.4 | 48.2 | 58.9 | 62.5 |
| 11(a) | ZnFe$_2$O$_4$ | 18.2 | 32.9 | 61.3 | 68.7 | 72.1 |
| 11(b) | ZnFe$_2$O$_4$/β-SiC(PT) | 19.1 | 33.4 | 64.2 | 71.1 | 73.7 |
| 12(a) | NiCr$_2$O$_4$ | 20.2 | 30.1 | 69.2 | 75.6 | 82.1 |
| 12(b) | NiCr$_2$O$_4$/β-SiC(PT) | 20.8 | 32.2 | 71.8 | 78.1 | 84.9 |
| 13(a) | ZnCr$_2$O$_4$ | 19.2 | 29.5 | 55.3 | 66.0 | 72.8 |
| 13(b) | ZnCr$_2$O$_4$/β-SiC(PT) | 19.6 | 32.7 | 58.5 | 68.6 | 76.8 |
| 14 | Cr$_2$O$_3$ | 18.3 | 45.1 | 71.2 | 80.1 | 84.2 |

TABLE 1-continued

Activity test of various supported catalysts in sulphuric acid decomposition reaction.

| | | % of conversion (decomposition) | | | | |
|---|---|---|---|---|---|---|
| Example | Catalyst | 750° C. | 800° C. | 850° C. | 900° C. | 950° C. |
| 15 | Cu$_2$O | 16.9 | 42.1 | 69.3 | 78.9 | 83.7 |
| 16(a) | 1%Pt/Al$_2$O$_3$ | 64.2 | 73.8 | 81.1 | 87.2 | 91.7 |
| 16(b) | 1%Pt/β-SiC(PT) | 67.1 | 76.2 | 83.2 | 88.1 | 92.5 |
| 17 | CuFeCrO$_b$/β-SiC(PT) (Co/Fe/Cr = 1:1:1) | 18.1 | 43.2 | 67.8 | 81.2 | 85.4 |
| 18 | CuFeCrO$_b$/β-SiC(PT) (Cu/Fe/Cr = 1:1:4) | 19.0 | 47.1 | 70.8 | 82.3 | 86.2 |
| 19 | Equilibrium | 69.5 | 78.8 | 85.4 | 90.1 | 93.1 |
| 20 | 12% Fe$_2$O$_3$/β-SiC(PT) | 60.1 | 74.4 | 84.2 | 88.2 | 91.8 |
| 21 | 12%CuO&Fe$_2$O$_3$/β-SiC(PT) | 61.4 | 75.9 | 85.1 | 89.9 | 91.9 |
| 22 | 12%CuFe$_2$O$_4$/β-SiC(PT) | 61.6 | 76.3 | 85.3 | 90.1 | 92.6 |
| 23 | 12%CuFe$_2$O$_4$/βSiC(PT)(HP) | 0.35 | 0.46 | 0.60 | 0.71 | — |

TABLE 2

Catalyst stability test of most active catalysts

| Example | Time in (h) | 0 | 10 | 25 | 50 | 100 | 200 | 300 |
|---|---|---|---|---|---|---|---|---|
| 1(b) | Fe$_2$O$_3$/β-SiC(R) | 69.5 | 67.3 | 62.2 | 55.2 | * | * | * |
| 1(d) | Fe$_2$O$_3$/β-SiC(PT) | 73.1 | 73.0 | 72.2 | 71.5 | 71.2 | 70.0 | 69.2 |
| 2(a) | Cu$_2$O/β-SiC(R) | 71.2 | 68.5 | 61.7 | * | * | * | * |
| 2(b) | Cu$_2$O/β-SiC(PT) | 75.3 | 74.1 | 73.4 | 72.1 | 71.2 | 70.4 | 68.6 |
| 3(a) | Cr$_2$O$_3$/β-SiC(R) | 74.8 | 70.3 | 66.7 | | | | |
| 3(b) | Cr$_2$O$_3$/β-SiC(PT) | 76 | 73 | 71 | 65.3 | | | |
| 4(a) | CuFe$_2$O$_4$/β-SiC(R) | 75.2 | 70.8 | 68.3 | 64.7 | | | |
| 4(c) | CuFe$_2$O$_4$/β-SiC(PT) | 76.5 | 76.3 | 75.4 | 74.2 | 73.0 | 72.4 | 71.3 |
| 5(a) | CuCr$_2$O$_4$/β-SiC(R) | 75.6 | 73.1 | 72.3 | 68.7 | | | |
| 5(b) | CuCr$_2$O$_4$/β-SiC(PT) | 78.3 | 76.4 | 73.4 | 68.1 | | | |
| 6 | FeCr$_2$O$_4$/β-SiC(PT) | 78.1 | 76.8 | 74.3 | 66.2 | | | |
| 7 | CuFe$_2$O$_4$/Al$_2$O$_3$ | 60 | 51 | 42 | | | | |
| 8 | Fe$_2$O$_3$/Al$_2$O$_3$ | 55 | 44 | 29 | | | | |

Iron(III) oxide was loaded on three different surface treated β-SiC as shown in the Table 1, example 1(b), 1(c) and 1(d). The catalyst activity was measured in a fixed bed reactor at various temperatures. It was clear that the catalyst prepared from the pre-treated support gives the highest conversion as compared to the as-received or pure silicon carbide. This high activity is attributed to the high dispersion of Iron (III) oxide on the support enriched with SiO$_2$. Similarly, among all the catalysts, Examples 4(c), Example 5 and Example 6 have shown highest activity over the temperature range considered, which again possess pre-treated or silicated β-SiC support. Although, these pre-treated support catalyst shows marginal high conversion as compared to the catalyst prepared by as-received catalyst support, but the stability of the catalyst surprisingly increased With silicated catalyst support of porous β-SiC. The stability of various catalysts were tested over a period of 10 to 300 h and are shown in Table 2. It appears that the catalyst supported on pre-treated silicon carbide was much more active, stable than the catalyst supported on as-received SiC or other supports. During the first 25 hours of the test, catalyst with all kind of β-SiC supports exhibited similar activity for the decomposition of sulfuric acid, while catalyst whose supports are pre-treated, Examples 4(c), 2(b) and 1(d) i.e. Catalyst CuFe$_2$O$_4$/β-SiC(PT), Cu$_2$O/β-SiC(PT), and Fe$_2$O$_3$/β-SiC (PT) have retained their activity up to 300 h of operation.

Example 20

Suitable amount of Iron precursor (ammonium iron citrate) dissolved in 10 ml of distilled water and then to 10 g of pre dried and degassed β-SiC(PT) extrudates of 2 mm size are added. Then, the resulting mixture is sonicated until whole solution absorbed by the support. Finally, the impregnated substrate is air dried at 100° C. and then calcined at 500° C. The final catalyst is 12% Fe$_2$O$_3$ supported on β-SiC(PT). 1 g of catalyst is loaded into the middle of the glass tube reactor. Feed of sulfuric acid was introduced through syringe pump along with the inert carrier gas nitrogen by Mass flow controller. Sulfuric acid flow rate was maintained in such a way that the mole fraction of SO$_3$ was 0.28 at the entrance of the catalyst bed and nominal residence time was 0.5 s in the bed. The reactor temperature is kept between 700° C. and 950° C. and pressure is kept at atmospheric pressure. For high pressure experiments (i.e. pressure between 1 to 20 bar) similar Hastelloy reactor is was used. The decomposed products (traces of H$_2$SO$_4$, SO$_3$, H$_2$O, SO$_2$ and O$_2$) over the catalyst were passed through a series of absorbers where all gases are absorbed for quantitative analysis except N$_2$ and O$_2$. The unabsorbed oxygen gas is quantified using gas chromatograph and online oxygen analyzer.

The catalyst was tested at 700° C. to 950° C. show that the equilibrium product distribution is established within about 0.5 second residence time at a temperature of 850° C. and the catalyst is considered very effective. The catalyst also retains its effectiveness and efficiency in sulfuric atmosphere within this temperature range and appears to be physical unaffected by exposure to it.

Example 21

β-SiC(PT) supported iron oxide (prepared in the Example 20) is dipped into the 10 ml solution of $Cu(NO_3)_2 \cdot 3H_2O$ (stoichiometric quantity) and sonicated for half an hour. Then the support is separated from the solution and air dried for another 30 min at 100° C. and then again added to the remaining solution in the same way as described above (Example 1). Then the resulting solid mixture is air dried at 100° C. and then calcined at 400° C. for 2 hours. The obtained catalyst by this process is the 12% copper-iron oxide (the ratio of Cu to Fe is 1:2) supported on β-SiC(PT).

The catalyst was tested (as described in Example 19) at 700° C. to 950° C. show that the equilibrium product distribution is established within about 0.5 second residence time at a temperature of 850° C. and the catalyst is considered very effective. The catalyst also retains its effectiveness and efficiency in sulfuric atmosphere within this temperature range and appears to be physical unaffected by exposure to it.

Example 22

2.681 g of Iron precursor (ammonium iron citrate) and 1.212 g of copper precursor (copper nitrate) dissolved in 30 ml of distilled water and then to 10 g of pre dried and degassed β-SiC(PT) extrudes of 2 mm size is added. After standing 2 h with intermediate agitations, the solvent was evaporated, then the catalyst dried at 70° C.-120° C. and calcined in the air for 3 h at 500° C. After the calcination, temperature adjusted between 1223 K-1273 K for a period of 2-5 hrs in the flowing air. The catalyst obtained by this method is 12% copper ferrite ($CuFe_2O_4$) supported on β-SiC(PT) with surface area of 24 $m^2/g$ The catalyst was tested (as described in Example 19) from 700° C. to 950° C. and FIG.1 shows that the equilibrium product distribution is established within about 0.5 second residence time at a temperature of 850° C. and the catalyst is considered very effective. The catalyst also retains its effectiveness and efficiency in sulfuric atmosphere within this temperature range and appears to be physical unaffected by exposure to it.

Example 23

The catalyst prepared in Example 22 is loaded into the Hastelloy high pressure reactor as described in the Example 20 and tested in the pressure ranges of 0.1 to 20 bar. The space velocity of sulfuric acid is maintained between 500 ml/g·catalyst-hr and 500,000 ml/g catalyst-hr. The reactor temperature is kept between 700° C. and 950° C. and pressure is kept at atmospheric pressure. The decomposed products (traces of $H_2SO_4$, $SO_3$, $H_2O$, $SO_2$ and $O_2$) over the catalyst were passed through a series of absorbers where all gases are absorbed for quantitative analysis except $N_2$ and $O_2$. The unabsorbed oxygen gas is quantified using gas chromatograph and online oxygen analyzer. Table 1 shows the percentage decomposition of $SO_3$ at 10 bar pressure and at a temperature of 850° C., the residence time kept at 0.5 s.

Figure 2:
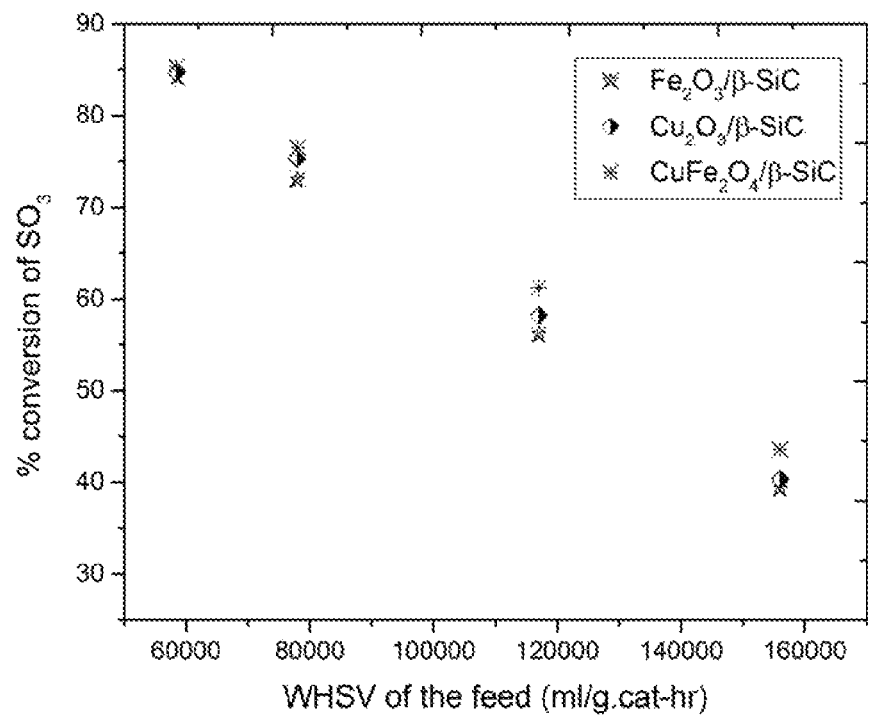
FIG. 2 illustrates the effect of space hourly velocity on the decomposition of $SO_3$.

FIG. 2 shows the conversion of $SO_3$ at various space velocities at a temperature of 850° C. and atmospheric pressure. The graph shows that plug flow condition has been maintained in the reactor during these space velocities.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

Although the subject matter has been described in considerable detail with reference to certain embodiments thereof, other embodiments are possible.

REFERENCES

[1] Lloyd A. Hydrogen Technical Advisory Panel Hydrogen Technical Advisory Panel (HTAP). 1st Hydrog. Fuel Cells Tech. Advis. Comm. Meet., 2006.

[2] Jain I P. Hydrogen the fuel for 21st century. Int J Hydrogen Energy 2009; 34:7368-78. doi:10.1016/j.ijhydene.2009.05.093.

[3] Funk J E, Reinstrom R M. Energy requirements in production of hydrogen from water. Ind Eng Chem . . . 1966; 5:336-42.

[4] Perkins C. Likely near-term solar-thermal water splitting technologies. Int J Hydrogen Energy 2004; 29:1587-99. doi:10.1016/j.ijhydene.2004.02.019.

[5] Norman J, Mysels K, Sharp R, Williamson D. Studies of the sulfur-iodine thermochemical water-splitting cycle. Int J Hydrogen Energy 1982; 7:545-56. doi:10.1016/0360-3199(82)90035-0.

[6] Leybros J, Gilardi T, Saturnin A, Mansilla C, Caries P. Plant sizing and evaluation of hydrogen production costs from advanced processes coupled to a nuclear heat source. Part I: Sulphur-iodine cycle. Int J Hydrogen Energy 2010; 35:1008-18. doi:10.1016/j.ijhydene.2009.11.054.

[7] Dokiya M, Kameyama T, Fukuda K, Kotera Y. The study of thermochemical hydrogen preparation. III. An oxygen-evolving step through the thermal splitting of sulfuric acid. Bull Chem Soc Jpn 1977; 50:2657-60.

[8] Tagawa H, Endo T. Catalytic decomposition of sulfuric acid using metal oxides as the oxygen generating reaction in thermochemical water splitting process. Int J Hydrogen Energy 1989; 14:11-7. doi:10.1016/0360-3199(89)90151-1.

We claim:

1. A process for conversion of sulphur trioxide to sulphur dioxide and oxygen comprising, the process comprising;
    placing a catalyst composition in a reactor, wherein the catalyst composition comprises an active material selected from the group consisting of transitional metal oxide, mixed transitional metal oxide, and combinations thereof; and a support material wherein the support material is crystallized porous β-SiC, wherein the active material to the support material weight ratio is in the range of 0.1 to 25 wt %;
    passing a flow of sulphur trioxide in the presence of an optionally used carrier gas over the catalyst composition at a temperature of 700° C.-900° C.; and
    recovering stream comprising of sulphur trioxide, sulphur dioxide, oxygen, water, and the optionally used carrier gas.

2. The process as claimed in claim 1, wherein the transitional metal is selected from the group consisting of Cu, Cr, and Fe.

3. The process as claimed in claim 1, wherein the active material is transitional metal oxide selected from the group consisting of oxides of Cu, Cr, and Fe.

4. The process as claimed in claim 1, wherein the active material is mixed transitional metal oxide selected from the group consisting of binary oxide, a ternary oxide, and a spinel.

5. The process as claimed in claim 1, wherein the active material is an oxide of Cu.

6. The process as claimed in claim 1, wherein the active material is an oxide of Cr.

7. The process as claimed in claim 1, wherein the active material is an oxide of Fe.

8. The process as claimed in claim 1, wherein the active material is a binary oxide of Cu, and Fe in the molar ratio of 1:2.

9. The process as claimed in claim 1, wherein the active material is an oxide of Cu, and Fe with a spinel structure.

10. The process as claimed in claim 1, wherein the active material is an oxide of Cu, and Cr with a spinel structure.

11. The process as claimed in claim 1, wherein the support material has a pore volume in the range of 0.05 to 0.9 cc/g.

12. The process as claimed in claim 1, wherein the support material has active surface area in the range of 5-35 m²/g, specific surface area as determined by BET multipoint nitrogen absorption method is in the range of 2 to 200 m²/g, the transitional metal content in the catalyst composition is in the range of 0.1 to 20 wt %, and the size of catalyst is in the range of 0.1 to 15 mm.

13. The process as claimed in claim 1, wherein the crystallized porous β-SiC support material is pre-treated β-SiC obtained by oxidizing silica free β-SiC in atmospheric air between 700 to 1000° C. for a period of 2 to 6 hours.

14. The process as claimed in claim 1, wherein the catalyst composition is used for decomposition of sulphuric acid.

15. The process as claimed in claim 1, wherein the catalyst composition is used for hydrogen production.

16. The process as claimed in claim 15, wherein the process is carried out at a pressure of 0.1 bar to 40 bar.

17. The process as claimed in claim 1, wherein the process comprises hydrogen production by splitting water into hydrogen and oxygen.

18. A process as claimed in claim 17 for hydrogen production comprising placing a catalyst composition in a reactor, wherein the catalyst composition comprises an active material selected from the group consisting of transitional metal oxide, mixed transitional metal oxide, and combinations thereof; and a support material, wherein the support material is crystallized porous β-SiC, wherein the active material to the support material weight ratio is in the range of 0.1 to 25 wt %;

passing a flow of sulphur trioxide in the presence of an optionally used carrier gas over the catalyst composition at a temperature of 700° C.-900° C.; and recovering stream comprising of sulphur trioxide, sulphur dioxide, oxygen, water, and the optionally used carrier gas and splitting water into hydrogen and oxygen, wherein the process further comprises decomposing sulfuric acid into water, sulphur dioxide and oxygen though a reaction represented by the following formula (R1) and elementary reactions represented by the following formulae (R1-1) and (R1-2).

$$H_2SO_4 \rightarrow H_2O + SO_3 + \frac{1}{2}O_2 \quad \text{R1}$$

$$H_2SO_4 \rightarrow H_2O + SO_3 \quad \text{R1-1}$$

$$SO_3 \xrightarrow{k} SO_2 + \frac{1}{2}O_2 \quad \text{R1-2.}$$

19. The process as claimed in claim 18, wherein the process follows an S-I cycle-process (sulphur-iodine cycle), a Westinghouse cycle process, or an Ispra-Mark 13 cycle process.

20. The process as claim in claim 19, wherein catalyst size is in the range of 0.1 to 15 mm.

21. The process as claim in claim 19, wherein sulphur trioxide space velocity is maintained between 500-500,000 ml/g·catalyst·hr.

22. The process as claimed in claim 1, wherein the process comprises hydrogen production by splitting water into hydrogen and oxygen by a process selected from the group consisting of S-I cycle process, a Westinghouse cycle process, an Ispra-Mark 13 cycle process, and a Los Alamos science laboratory cycle process.

23. The process as claimed in claim 1, wherein catalyst size is in the range of 0.1 to 15 mm.

24. The process as claimed in claim 1, wherein sulphur trioxide space velocity is maintained between 500-500,000 ml/g·catalyst·hr.

25. The process as claimed in claim 1, wherein the process is carried out at a pressure of 0.1 bar to 40 bar.

* * * * *